US009828166B2

(12) United States Patent
Bouffand et al.

(10) Patent No.: US 9,828,166 B2
(45) Date of Patent: Nov. 28, 2017

(54) SELF COLLAPSIBLE BLOW MOULDED PLASTIC THIN-WALLED CONTAINERS AND A DISPENSING METHOD USING SAME

(71) Applicant: SOCIETE ANONYME DES EAUX MINERALES D'EVIAN "S.A.E.M.E.", Evian-les-Bains (FR)

(72) Inventors: Marie-Bernard Bouffand, Le Lyaud (FR); Alain Colloud, Reyvroz (FR); Christine Gehringer, Vinzier (FR); Agnieszka Jeziorska, Jr., Thonon-les-Bains (FR)

(73) Assignee: SOCIETE ANONYME DES EAUX MINERALES D'EVIAN et en abrégé "S.A.E.M.E.", Evian-les-Bains (FR)

( * ) Notice: Subject to any disclaimer, the term of this patent is extended or adjusted under 35 U.S.C. 154(b) by 0 days.

(21) Appl. No.: 14/758,330

(22) PCT Filed: Dec. 28, 2012

(86) PCT No.: PCT/EP2012/077069
§ 371 (c)(1),
(2) Date: Jun. 29, 2015

(87) PCT Pub. No.: WO2014/101956
PCT Pub. Date: Jul. 3, 2014

(65) Prior Publication Data
US 2015/0321826 A1   Nov. 12, 2015

(51) Int. Cl.
*B65D 83/00* (2006.01)
*B64D 1/02* (2006.01)
(Continued)

(52) U.S. Cl.
CPC .......... *B65D 83/00* (2013.01); *B29C 33/0011* (2013.01); *B29C 49/08* (2013.01);
(Continued)

(58) Field of Classification Search
CPC ...... B65D 83/00; B65D 1/0207; B65D 1/023; B65D 1/0276; B65D 1/0292; B65D 1/40;
(Continued)

(56) References Cited

U.S. PATENT DOCUMENTS 3,864,437 A * 2/1975 Blaszkowski ............. F24F 6/04
261/120
4,261,473 A * 4/1981 Yamada ............... B29C 49/0005
215/12.2
(Continued)

FOREIGN PATENT DOCUMENTS

EP  1 436 203   7/2004
EP  1 468 930   10/2004
(Continued)

*Primary Examiner* — Frederick C Nicolas
(74) *Attorney, Agent, or Firm* — Clark & Brody

(57) ABSTRACT

A blow molded bottle (1): a) which is self-collapsible during its emptying; b) which comprises at least two transversal grooves and/or ribs (6.1), preferably located in the tubular body portion (6), equipped with collapse starters (6.2); c) wherein the mean wall thickness (Tmean) of the tubular body portion (6) is—in an increasing order of preference—less than or equal to 200; 180; 160; 150 μm; preferably comprised between 65 and 150; and more preferably comprised between 90 and 130 μm. The invention also discloses a method, a preform (100) and a mold for the manufacture of the aforementioned container by blow molding. The invention also discloses a method for bottling liquid into the bottles (1), a method for dispensing the liquid, a dispenser for implementing the method and a method for packing the thin-walled bottles, in view of storage and transportation.

26 Claims, 8 Drawing Sheets

(51) Int. Cl.
| | | |
|---|---|---|
| *B65B 11/02* | (2006.01) | |
| *B29C 33/00* | (2006.01) | |
| *B29C 49/08* | (2006.01) | |
| *B29C 49/16* | (2006.01) | |
| *B29C 49/48* | (2006.01) | |
| *B65D 1/02* | (2006.01) | |
| *B65D 71/00* | (2006.01) | |
| *B65D 71/02* | (2006.01) | |
| *B65D 1/40* | (2006.01) | |
| *B65D 85/16* | (2006.01) | |
| *B67D 3/00* | (2006.01) | |
| *B29L 23/00* | (2006.01) | |
| *B29K 67/00* | (2006.01) | |
| *B65B 27/04* | (2006.01) | |

(52) U.S. Cl.
CPC ............. *B29C 49/16* (2013.01); *B29C 49/48* (2013.01); *B65B 11/02* (2013.01); *B65D 1/023* (2013.01); *B65D 1/0207* (2013.01); *B65D 1/0276* (2013.01); *B65D 1/0292* (2013.01); *B65D 1/40* (2013.01); *B65D 71/0096* (2013.01); *B65D 71/02* (2013.01); *B65D 85/16* (2013.01); *B67D 3/0035* (2013.01); *B67D 3/0061* (2013.01); *B29K 2067/003* (2013.01); *B29L 2023/00* (2013.01); *B65B 27/04* (2013.01); *B65D 2501/0018* (2013.01); *B65D 2501/0036* (2013.01)

(58) Field of Classification Search
CPC ...... B65D 7/0096; B65D 71/02; B65D 85/16; B65D 2501/0018; B65D 2501/0036; B29C 33/0011; B29C 49/08; B29C 49/16; B29C 49/48; B65B 11/02; B65B 27/04; B67D 3/0035; B67D 3/0061; B29L 2023/00; B29K 2067/003

See application file for complete search history.

(56) References Cited

U.S. PATENT DOCUMENTS

| | | | | |
|---|---|---|---|---|
| 4,775,564 | A * | 10/1988 | Shriver | B29C 49/0005 138/119 |
| 4,883,473 | A * | 11/1989 | Thomas | A61M 5/282 222/107 |
| 5,082,260 | A * | 1/1992 | Dinelli | A63B 21/078 482/104 |
| 5,632,397 | A | 5/1997 | Fandeux et al. | |
| 6,283,336 | B1 * | 9/2001 | Dwyer | A61K 8/0208 222/190 |
| 6,592,918 | B2 * | 7/2003 | Kaeser | B29C 65/08 383/202 |
| 8,127,955 | B2 * | 3/2012 | Denner | B65D 79/005 215/373 |
| 8,152,010 | B2 * | 4/2012 | Melrose | B65D 1/0276 215/373 |
| 8,276,775 | B2 * | 10/2012 | Boukobza | B65D 1/0223 215/381 |
| 8,956,707 | B2 * | 2/2015 | Hanan | B29B 11/14 428/35.7 |
| 2010/0206876 | A1 | 8/2010 | Outreman | |
| 2012/0055953 | A1 * | 3/2012 | Shiotani | B67D 3/0009 222/67 |

FOREIGN PATENT DOCUMENTS

| | | |
|---|---|---|
| EP | 1 527 999 | 5/2005 |
| JP | 2001-122237 | 5/2001 |
| WO | 2011/061343 | 5/2011 |

\* cited by examiner

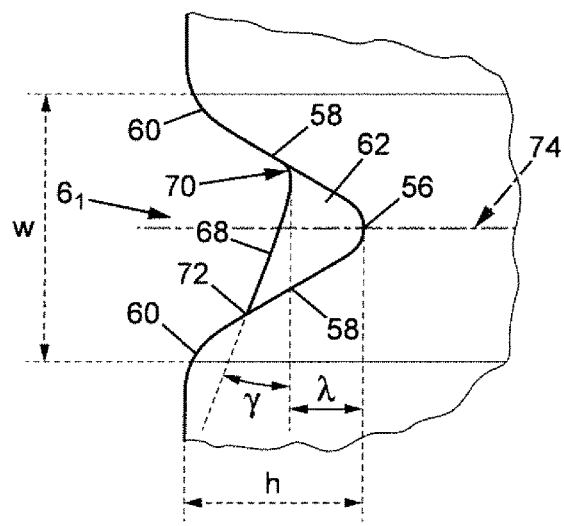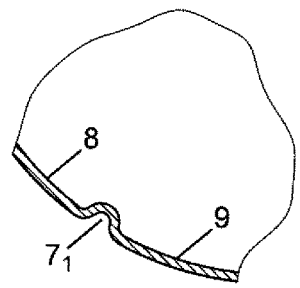
FIG. 1A'
FIG. 1A"
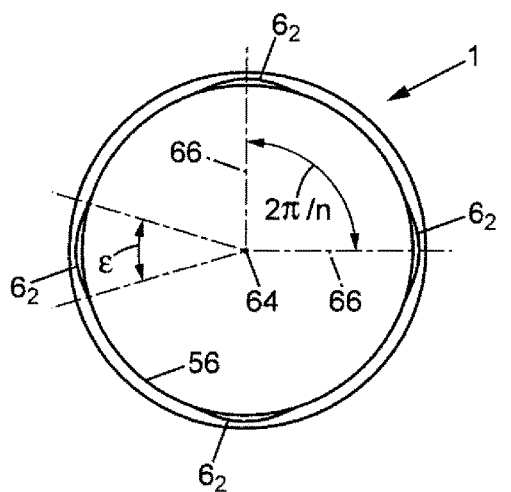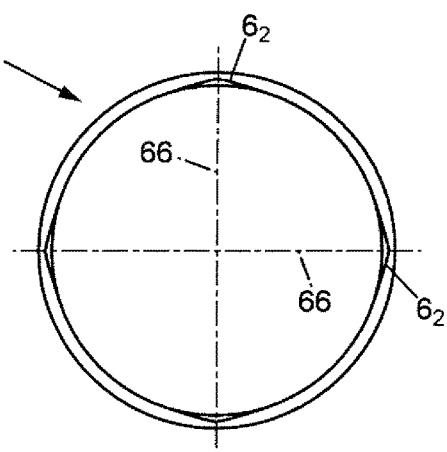
FIG. 1C
FIG. 1D

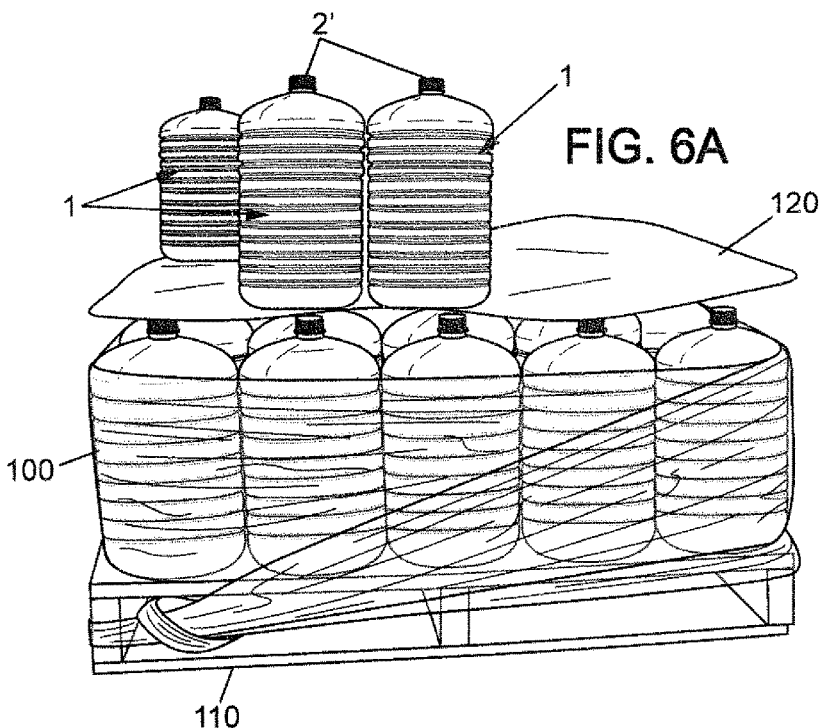
FIG. 6A
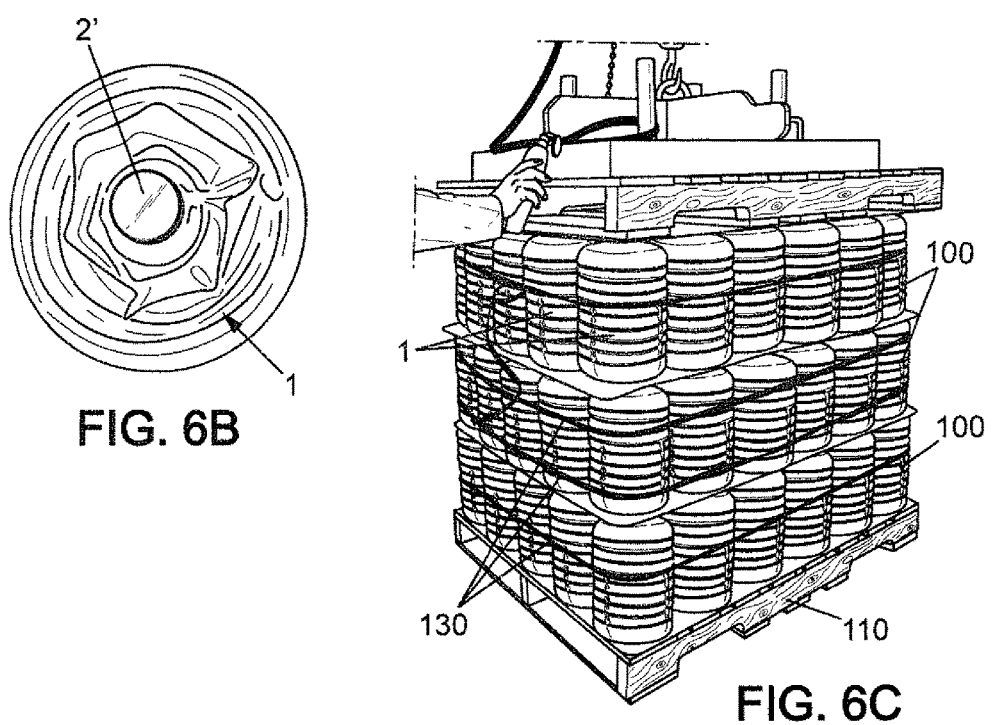
FIG. 6B
FIG. 6C

SELF COLLAPSIBLE BLOW MOULDED PLASTIC THIN-WALLED CONTAINERS AND A DISPENSING METHOD USING SAME

FIELD OF THE INVENTION

This invention relates generally to the construction of a thin-walled container, preferably a bottle, suitable for containing water or other liquids. It is particularly applicable to the construction of thin-walled bottles for containing water for human consumption (generically drinking water hereafter) and which can be used in conjunction with water dispensing units.

BACKGROUND OF THE INVENTION

Large containers, also named jugs, which are employed in the servicing of drinking water in dispensing units are customarily cylindrical in form. Such jugs, when applied to units of the electrical or non-electrical type, are inverted and positioned upon the upper portion of the dispensing unit to supply water to an inner reservoir as it is being dispensed. Water is supplied to the reservoir from a replaceable jug which is inverted on the top of the cooler unit, the neck of the bottle being placed in a funnel-shaped inlet to the reservoir at the top of the dispensing unit. Pumps can also be used to supply water out of the jugs. The capacity of a typical jug is of the order of five gallons. When all the water in the jug has been dispensed the empty jug is removed and replaced by another full bottle. Usually a supply of full jugs is kept at the site and from time to time the supplier will deliver a fresh supply of filled jugs and collect the empty jugs for cleaning and refilling.

The jugs are blow moulded from plastic material such as polyester terephtalate or polycarbonate. A plastic cap fits over the top of the neck to close the jug whilst it is in transit or storage. These jugs are difficult to lift and manoeuvre into position on the cooler unit because of their bulk and weight when full.

Because these jugs are returnable and refillable, they are thus subjected to numerous handling and storage operations and conditions, wherein they are exposed to mechanical constraints such as abrasive wear, notably in the contact area between the jugs after stacking, or such as drops.

Then, the requirements of the moulded plastic jugs are notably resistance to abrasion (scuffing) and impact or drop resistance.

In this respect, the moulded plastic jugs have a wall thickness of at least 400 µm, preferably 500 µm, and more preferably comprised between 600 and 1500 µm. This wall thickness requirement is linked to the relatively large capacity of the thin-walled bottle, i.e at least, in an increasing order of preference and in liters: 10; 15; 21.

The fact that these jugs are returnable and can be reused, involves numerous constraints, such as organization of a delivery circuit of full thin-walled bottles and of a circuit for picking up empty jugs. Moreover, these empty jugs are cumbersome and must be washed and treated before their refilling. This involves sanitary issues. New caps have also to be put on the refilled bottles.

Due to their frequent handling and to their storage conditions, they are submitted to scuffing, which gives them an unsightly aspect inappropriate to the marketing.

Insofar as these jugs are rigid, each sampling of liquid (e.g. water) involves an intake of ambient air to compensate for the sampled volume. In doing so, the compensating ambient air contaminates the liquid (e.g. water). This contamination comes to a head as the thin-walled bottle is almost empty. This is a noteworthy sanitary drawback.

To sum up, these jugs are expensive, heavy, difficult to handle and to market, and tricky with respect to sanitary issues.

Thin-walled PET containers for beverages (e.g. water) made by Injection moulding of a preform, as well as Stretching, Blowing and Moulding (ISBM), are also known.

EP1436203B1 discloses a PET container including walls made of flexible PET plastic and comprising a 30-100 µm-walled body (1) with greater section of dimension (d1) and neck (2) with internal diameter (d2), closed by a closing-off member (3). The wall(s) (4) forming the body of the container is made of flexible plastic which can be deformed for constant surface area, particularly under the weight of the flowable product contained in the container when the wall(s) encounter a point or bearing surface, so as to form, non-planar wall portion (5).

The ratio of d2 on d1 is 1:3-1:10. These containers however are unpractical for example due to a bad resistance and/or low compactability.

EP1468930B1 concerns a container having a body (1) formed by a wall (4) with a diameter S1 and at least a neck (2) with a diameter S2, made from a semi-crystalline PET, having a wall thickness of less than 100 µm, substantially in the middle of its body and having a complex, three dimensional shape (3) convenient for gripping, this part having diameter S3. These containers however are unpractical for example due to a bad resistance and/or low compactability.

EP1527999B1 describes a container comprising a body formed by walls and a bottom having in his greater section a dimension d1 and a neck with an internal diameter d2, said container being made from a semi-crystalline PET, the body of said container comprising at its bottom at least three feet spaced from each other and being integral with said body, wherein for the body, the ratio weight of the walls on weight of the bottom is comprised between 3 and 4 and wherein the ratio volume, in ml of the body of the container per gram of PET of the body is comprised between 80 and 120, and wherein the walls of the body have a thickness of less than 100 µm, and the bottom has a thickness between 100 µm and 200 µm, and each foot has a wall thickness of 50 µm to 150 µm. These containers however are unpractical for example due to a bad resistance and/or low compactability.

Nevertheless, such arrangements are not compatible with large volumes because the thus produced containers cannot be handled except to increase the amounts of material.

JP2001122237 discloses a PET thin-walled bottle including a neck segment 1, a shoulder 2, a barrel segment 3 is formed into a thin-walled segment. The shoulder 2 is formed to have a wall thickness of 0.2 to 0.3 mm. A segment ranging from an interface 5 of the shoulder 2 to a part lower than the barrel 3 is formed to have an ultrathin wall of 0.02 to 0.05 mm in such a way that the shoulder can be pushed into the barrel after use of the thin-walled bottle, to enable the thin-walled bottle to be scrapped. A deformation strength of the barrel 3 is increased by notch of a lateral rib 6 of optional shape. These containers are however unpractical.

US2010206876A1 pertains to a PET disposable thin-walled high-capacity container is obtained by blowing a preformed shape 10 that has a collar 12 and a neck 14 designed to receive a plug 16 and is able to exhibit residual stresses after its shaping to the desired volume. The container has a material weight/developed surface ratio of said container of between 150 g/m² and 250 g/m². The container is filled with water under cold conditions and without pressure, and then sealed using a plug that can be pierced.

This container 18, after filling, undergoes a peripheral heating that is designed to release residual stresses that are stored in the material. These released stresses have a tendency to bring the container back to its initial shape before the blowing process, i.e., that of the preformed shape. Because of this tendency toward a reduction of volume of the container and because the liquid that is contained, in this case water, is incompressible, a pressurization of the liquid by the container occurs, which makes this container 20 essentially compact and therefore easy to handle.

This compact container can be set upside down in a dispenser, including a trocard which pierces the plug and depressurizes the container which becomes soft and must be held by receiving means thereof. The dispensing of water is facilitated by a ballast 32 which is not convenient. These containers are however unpractical, due the need of a ballast for compacting efficiently. Moreover, these containers are not adapted to be stored easily in a minimum of space.

OBJECTIVES OF THE INVENTION

In the above recalled background, the invention aims at fulfilling at least one of the following objectives:

1. Providing (blow) mold plastic thin-walled containers, preferably bottles, which can be used in servicing of beverages (e.g. water) units, which have relatively high volumetric capacity, for instance greater than 2.0 liters, which overcome the drawbacks of the prior art.
2. Providing (blow) mold plastic thin-walled containers, preferably bottles, which are food compatible, single use, and so environment-friendly, cost effective.
3. Providing (blow) mold plastic thin-walled containers, preferably bottles, which requires less plastic raw material as possible, while they are waterproof and airtight and they can be easily handled, stored and stacked.
4. Providing (blow) mold plastic thin-walled containers, preferably bottles, which can be used in liquid (e.g water) dispenser, without being subjected to air contamination at each sampling.
5. Providing (blow) mold plastic thin-walled containers, preferably bottles, which could have high volumetric capacity (e.g. between 2 liters up to 50 liters) while having high resistance to shock (drop).
6. Providing (blow) mold plastic thin-walled containers, preferably bottles, which fulfil at least one of the objectives 1 to 5 and which are compactable which is a substantial advantage in the management of wastes.
7. Providing (blow) mold plastic thin-walled containers, preferably bottles, which can be used in liquid (e.g water) dispenser wherein they are self-collapsable during spilling in an upside down position, till full emptying of the containers.
8. Providing (blow) mold plastic thin-walled containers, preferably bottles, which fulfil at least one of the objectives 1 to 7 and which have an attractive appearance during its shelf life.
9. Providing a moulded plastic preform for the manufacture by (blow) molding of thin-walled containers, preferably bottles, as referred to in at least one of the objectives 1 to 8.
10. Providing a cost effective and high-performance method for the manufacture by (blow) molding of thin-walled containers, preferably bottles, as referred to in at least one of the objectives 1 to 8.
11. Providing a mold for the manufacture by (blow) molding of thin-walled containers, preferably bottles, as referred to in at least one of the objectives 1 to 8.

DESCRIPTION OF THE INVENTION

The above objectives, among others, are fulfilled by the present invention which concerns, in a first aspect, a plastic thin-walled container having:
- a top part comprising a neck finish;
- a tubular body portion;
- and a bottom structure opposite to the top part, preferably a bottle, notably for beverages, characterized:
  a) in that it is self-collapsable during its emptying;
  b) in that it comprises at least two transversal grooves and/or ribs, preferably located in the tubular body portion, optionally with at least some of them being each equipped with at least two collapse starters;
  c) in that the mean wall thickness ($T_{mean}$) of the tubular body portion is—in an increasing order of preference—less than or equal to 200; 180; 160; 150 µm; preferably comprised between 65 and 150 µm; and more preferably comprised between 90 and 130 µm; for example higher than 70 µm, higher than 100 µm, from higher than 70 µm to lower than 90 µm, or from 90 to 100 µm or from higher than 100 µm to lower than 130 µm.

The thin-walled container, preferably a bottle, according to the invention is endowed with the required properties: food compatible, single use, environment-friendly, waterproof and airtight, easy handling, storing and stacking up, non subjected to air contamination at each sampling in a dispenser, good mechanical properties (shocks & scuffing strength), lightness, attractive appearance, and best balance of properties and cost/performance ratios deemed necessary to plastic containers.

The self-collapsibility of the container during its emptying, without any guide (the container is self-supported) and/or any additional force (ballast), is a noteworthy attractive feature. Moreover, these thin-walled containers (bottles) can be pressurized simply by piling up, for the storage and the transportation.

And above all, having been filled with a liquid, closed with a cap, set upside down, and connected by piercing of the cap to a dispenser, without retaining means, said thin-walled container, preferably a bottle, can be emptying by sampling of the liquid, without contamination of the liquid by the ambient air, the succession of samplings involving an auto-collapsing of the container, which finally a compacted recyclable waste, that highly facilitates the storage and the transportation of this waste.

In a second aspect, the invention pertains to a moulded plastic preform for the manufacture by blow molding of the thin-walled container, preferably a bottle, according to the invention, said preform comprising from the top to the bottom:
- a neck finish including a neck end and a neck support ring
- a neck;
- a transition zone;
- and a closed tubular body portion.

In a third aspect, the invention relates to a method for the manufacture by blow molding of the thin-walled container (preferably a bottle) according to the invention. Said method comprises the steps of:
A. moulding a plastic preform according to the invention,
B. possibly heat conditioning and preblowing the preform obtained in step A, C. stretch blow moulding of the preform of step A and possibly step B, in a mould the cavity of which being the thin-walled container according to the invention;

D. taking out of the thin-walled bottles.

In a fourth aspect, the invention relates to a mold for the manufacture by blow molding of the thin-walled bottle according to the invention.

In a fifth aspect, the invention relates to a method of bottling a liquid into the thin-walled bottle according to the invention, or a thin-walled container obtained by the method according to the invention, wherein the thin-walled container is filled with a liquid which is intended to put the thin-walled container under pressure and gives it a mechanical holding/resistance to deformation, after closing and once the container rests on a flat support In a sixth aspect, the invention relates to a method for dispensing a liquid contained in the thin-walled container (preferably a bottle) according to the invention, or a thin-walled container (preferably a bottle) obtained by the method according to the invention, wherein:
1. a filled thin-walled container is set up-side down on a dispenser comprise at least a valve for controlling the flowing of the liquid;
2. the valve for controlling the dispensing of the liquid is opened;
3. the liquid flows out and the thin-walled container self collapses;
4. the valve for controlling the flowing of the liquid is closed to stop the flowing and the self-collapse;
5. the collapsed thin-walled container is withdrawn of the dispenser and replaced by a filled thin-walled container as soon as the collapsed thin-walled container does not dispense liquid any longer.

In a seventh aspect, the invention relates to a dispenser for implementing the method of dispensing according to the invention, characterized in that it comprises a base including in its top a seating designed to receive the top part of the thin-walled container according to the invention, or a thin-walled container obtained by the method according to the invention, said container being set up-side down, said seating comprising connecting means between the inside of the thin-walled container and a conduct linked to an outlet, where the liquid coming from the thin-walled container can be dispensed, the flowing of the liquid through the conduct being controlled by at least one valve.

In an eight aspect, the invention relates to a method for packing in view of storage and transportation, the thin-walled containers according to the invention, or thin-walled containers obtained by the method according to the invention, wherein the thin-walled containers are stacked on a pallet on several levels, preferably by intercalating at least a plate between two successive levels, each level is strapped, and a axial pressure is exerted on the top of the pallet so as to retract the tops and/or the bottoms of the palletized thin-walled containers to increase their non-deformability properties.

PREFERENCES

Some of the remarkable features of the container (e.g. the bottle) stem from the fact said container is characterized by the following stretching ratios:
hoop stretch ratio: 4.0-6.5; preferably 4.2-6.0
axial stretch ratio: 2.8-5.0; preferably 3.0-4.5
overall stretch ratio: 11.20-32.5; preferably 12.6-27.0

According to a favorite embodiment of the invention, the thin-walled container is manufactured by Blow Moulding processes, preferably Injection Stretch Blow Moulding processes. Such processes are known by the one skilled in the art. They typically involve making a plastic preform by an injection process and then heating and blowing the preform, optionally with stretching.

The plastic preform, and de facto the container obtained therefrom, is preferably made of a (thermo)plastic material chosen preferably among the polymers which exhibit strain hardening when they are elongated, and, more preferably among the polymers which exhibit strain hardening when they are elongated, and, more preferably among the polyesters, particularly the aromatic polyesters, more particularly chosen in the group comprising, and even more particularly consisting in: PolyEthylene Terephtalate (PET) and/or PolyEthyleneNaphtalate(PEN) or PolyEthylene Furanoate (PEF), Polypropylene Terephtalate (PPT).

In a preferred embodiment, the thin-walled container according to the invention is preferably a bottle wherein the top part includes:
a neck finish including a neck end (preferably designed in order to receive a screwed cap or a snap cap) and a neck support ring,
a neck
and a shoulder joining the neck to the tubular body portion.

The plastic thin-walled container according to the invention, has a volume, typically when filled, of at least-given in liters and in an increasing order of preference-2; 3; 5; and more preferably comprised in a range of 2-20 liters, preferably of 7.5-12.5 liters According to an outstanding feature of the (moulded) plastic thin-walled container—e.g. bottle—of the invention, each transversal groove or rib, preferably located in the tubular body portion of the container, comprises at least 2, preferably at least 4, and more preferably between 4 and 8 collapse/fold starters.

The collapse starters preferably extend inwardly -recess- or outwardly -pin- with respect to the axis of the thin-walled bottle.

For example, at least one transversal groove or rib:
a) has two coplanar edges and an intermediate portion between the two edges, said intermediate portion presenting an apex inwardly (groove) or outwardly (rib) shifted with respect to the two edges;
b) and presents a width (w) measured between the two edges and a maximum height (h) measured between the edges and the apex.

For example, said collapse/fold starters have at least one of the following features:
i) they extend advantageously inwardly -recess- or outwardly -pin- with respect to the axis of the thin-walled container—e.g. bottle—;
ii) and they are uniformly distributed and angularly offset around the axis of the thin-walled container—e.g. bottle—from one groove or rib to another, the outward or inward extent λ of each of said collapse/fold starters -recess/pin- in the midplane of said groove or rib being preferably about h/2.

The transversal groove or rib preferably fulfils to at least one of the following specifications:
i) its width (w) and its maximum height (h) are such that the ratio of the maximum height to the width (h/w) is—in an increasing order of preference—greater than or equal to 0.8; 1.0; 1.2; and preferably comprised between 1.2 and 200; 1.2 and 50; 1.2 and 20;

ii) it has a shape in straight longitudinal section chosen in the group comprising—still better composed of—: U-shape; V-shape and combinations thereof.

According to an outstanding feature of the (moulded) plastic thin-walled container—e.g. bottle—of the invention, its tubular body portion is substantially cylindrical, polyhedral or comprised substantially plane face(s) and curved face(s), preferably substantially plane face(s) linked by curved face(s).

Advantageously, the transversal grooves and/or ribs of the plastic thin-walled container—e.g. bottle—, can be continuous or discontinuous.

According to an outstanding feature of the (moulded) plastic thin-walled container (bottle) of the invention, it includes at least one terminal retractable part, which is in the top part and/or in the bottom structure of the thin-walled bottle.

When the thin-walled container (bottle) includes at least one terminal retractable part of its bottom:
said bottom is preferably retractable under the effect of the thin-walled bottle's own weight, when said thin-walled container contains a liquid and when the bottom's thin-walled container rests on a (flat) support;
said terminal retractable part is preferably a bulge when the thin-walled container is filled with a liquid and when its bottom does not rest on a (flat) support.
and/or the bottom structure comprises:
a terminal curved portion
an outwardly axially extended terminal retractable bulge,
and at least one retractation starter joining the terminal curved portion to the bulge which is preferably chosen in the group comprising—still better composed of—: grooves and/or folding lines and/or ribs, grooves and/or folding lines being preferred.

When the thin-walled container includes at least one terminal retractable part in its top area, said part is preferably the neck finish, the neck and at least a part of the shoulder, and its top is preferably retractable under the effect of a (preferably axial) force which is applied in order to stack the thin-walled container(s)—e.g. bottle(s)—and/or by the thin-walled container(s)—e.g. bottle(s)—laid above.

In a preferred embodiment, the terminal retractable part in the top area comprises at least one retractation starter, which is preferably chosen in the group comprising—and still better composed of—: grooves and/or folding lines and/or ribs, ribs being preferred.

Such a retractation of the top and/or the bottom of the container—e.g. bottle—contributes to the pressurization of the bottle filled with a liquid.

Concerning the method for manufacturing of the plastic thin-walled container—e.g. bottle—, it is noticeable that its step C of stretch blow moulding of the preform is preferably performed so as to give to the of the plastic thin-walled container—e.g. bottle—, the following stretching ratios:
hoop stretch ratio: 4.0-6.5; preferably 4.2-6.0;
axial stretch ratio: 2.8-5.0; preferably 3.0-4.5;
overall stretch ratio: 11.20-32.5; preferably 12.6-27.0.

According to an interesting possibility, the container according to the invention can be free from one or several vertical groove(s) and/or folding line(s) and/or rib(s).

Definitions

According to the terminology of this text, the following non limitative definitions have to be taken into consideration:

Every singular designates a plural and reciprocally.
"thin-walled container or bottle" refers to any container for liquids; said container being in particular adapted for beverage dispensers (Home & Office Delivery HOD), the capacity of which being, for instance, between 2 and 50 liters.
"liquid" refers to any liquid which is intended to be contained in the thin-walled container or bottle according to the invention, especially a beverage like water or a non-food liquid such as a home care product or a personal care product, preferably a beverage
"plastic" refers to mouldable thermoplastic homopolymer or copolymer which preferably exhibits strain hardening when they are elongated.
"moulded" refers to any forming technique of thermoplastic raw materials, such as extrusion blow moulding, extrusion profiles & sheet, injection blow moulding, injection moulding (gas assisted), injection stretch blow moulding insert moulding, rotational moulding.
"substantially" means at least 80%, preferably at least 90%, more preferably at least 95%.
"circa" or "around" means with a tolerance of +/−10%.

DETAILED DESCRIPTION OF THE INVENTION

The following description of a preferred embodiment of a thin-walled container according to the invention, namely a bottle, will make it possible to well understand the invention and to emphasize all its advantages and variants.

BRIEF DESCRIPTION OF THE DRAWINGS

This description is made in reference to the enclosed drawings wherein:
FIG. 1A' is a view on a larger scale showing a detail in circle A' of FIG. 1A;
FIG. 1A" is a view on a larger scale showing a view in longitudinal section of a detail in circle A" of FIG. 1A;
FIG. 1C is a reduced scale-diagram showing the shape of the collapse starters of a groove of the thin-walled bottle according to the invention, as seen from above;
FIG. 1D is a view that corresponds to FIG. 1C, but for a variant embodiment.

FIGS. 6A-6C shows respectively the stacking of the filled thin-walled bottles according to the present embodiment (6A), the pressurization of a stacked thin-walled bottles by retractation of the bottles' tops (6C), and a top view of a retracted bottle (6B).

The thin-walled bottle shown on the enclosed drawings, especially FIGS. 1A-1B-2 is a biaxial stretched blowed molded thin-walled bottle (1), which has a general cylindrical shape and which is made of PET, without being limited to this specific substance, it being also possible to make the bottle out of a material that is simple or composite, multi-layer or compound, such as PVC or a polyolefin or a polyester. This thin-walled bottle (1) has a large-sized (e.g 20 liters) and is notably intended to contain water and to be set upside down on dispenser unit for Home and Office Delivery (HOD) as shown on FIG. 5A.

Figure 1A:
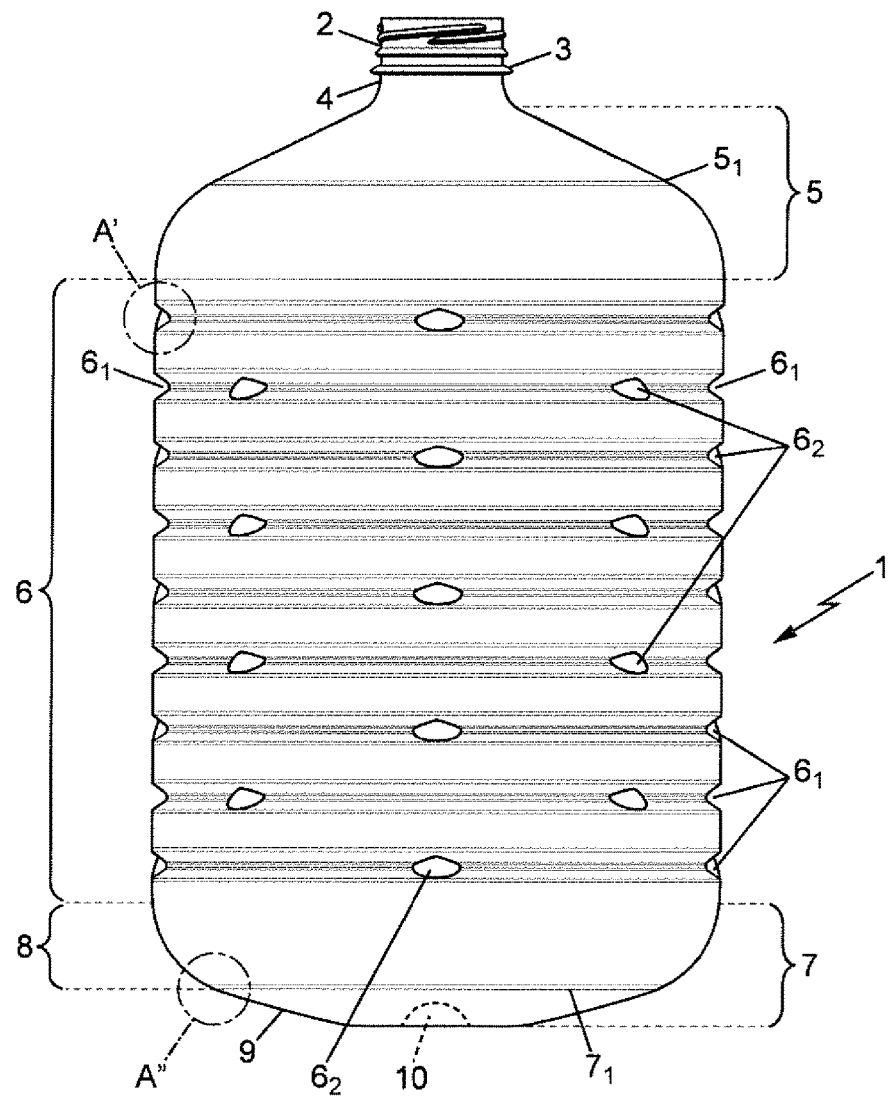
FIG. 1A is a front view of an empty and non-capped thin-walled bottle according to the invention, the bottom of which is non-retracted.
Figure 1B:
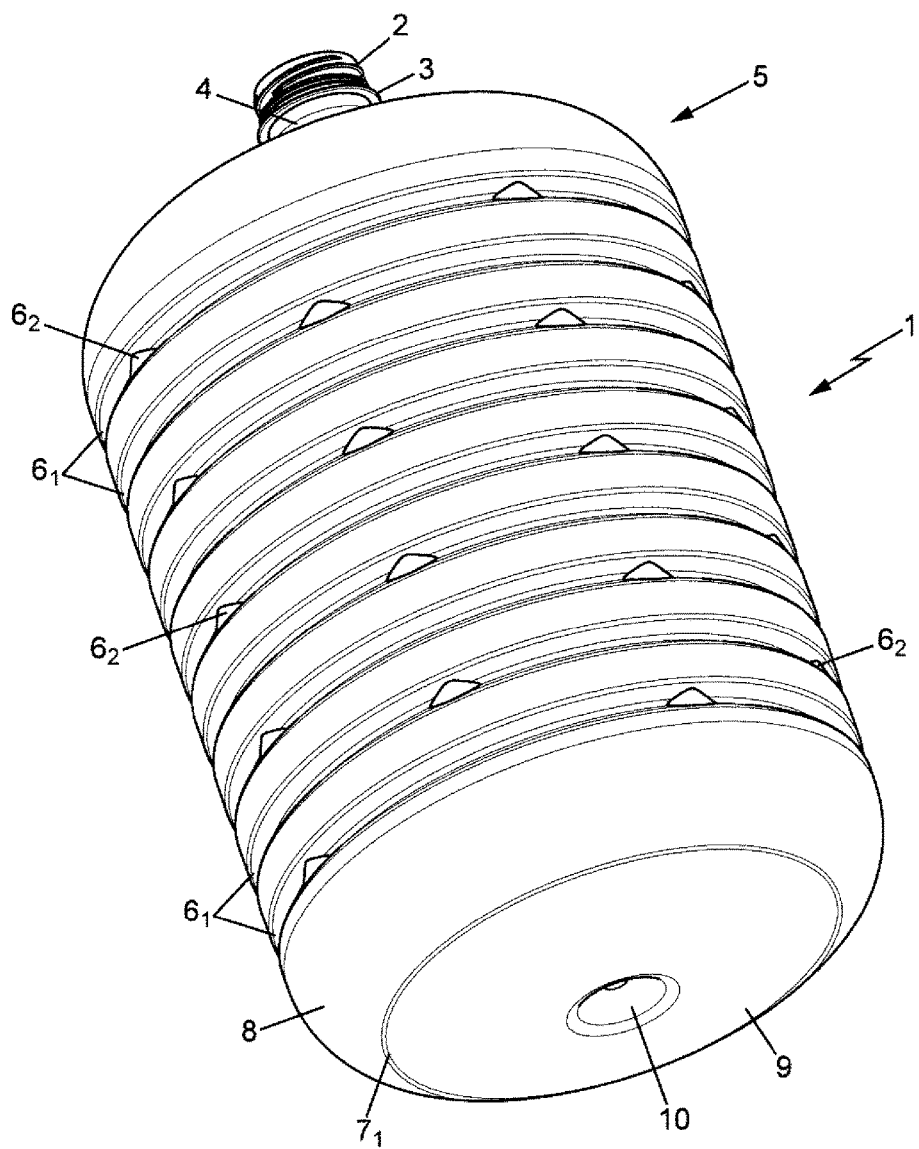
FIG. 1B is a perspective view from the bottom of the thin-walled bottle of FIG. 1A.
Figure 2:
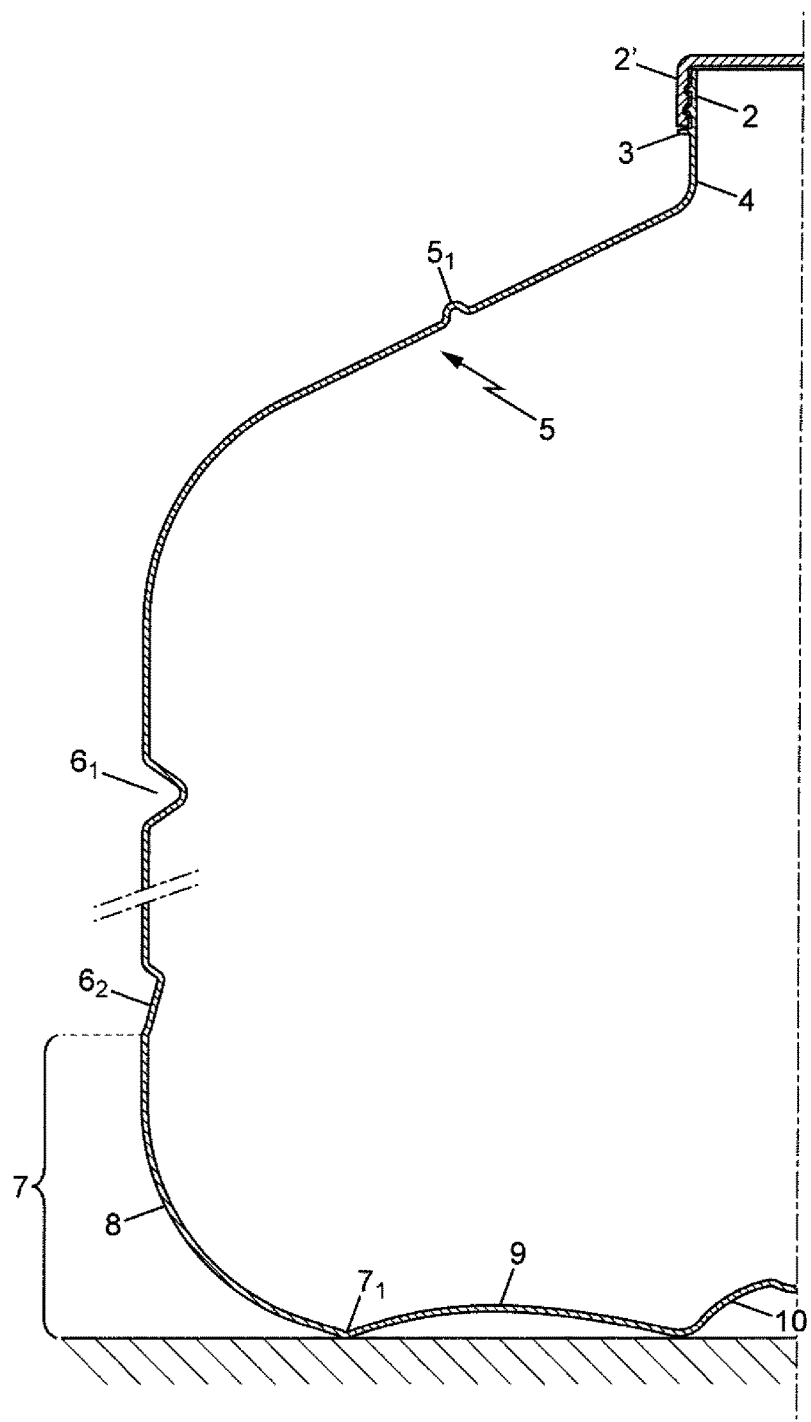
FIG. 2 comprises a partial longitudinal section of an thin-walled bottle according to the invention, which is filled with water and capped as the bottle of FIG. 5C, which rests on a flat support, and the bottom of which is retracted.

This thin-walled bottle (1) is composed, from the top to the base, of the following parts:
- a neck end (2),
- a neck support ring (3),
- a neck (4),
- a shoulder (5) joining comprising one retraction starter (5₁), which is a rib in this example—see FIGS. 1A,2-,
- a tubular body portion (6) which is imprinted with several continuous transversal grooves (6₁) and with several collapse/fold starters (6₂) located in the grooves (6₁), and an integral bottom structure (7) including:
  - a terminal curved portion (8)
  - an outwardly axially extended terminal retractable bulge (9)
  - and at least one retraction starter (7₁) which joins the terminal curved portion (8) to the bulge (9), and which is a groove in this example—see FIGS. 1A,1A",1B-.

Figure 5A:
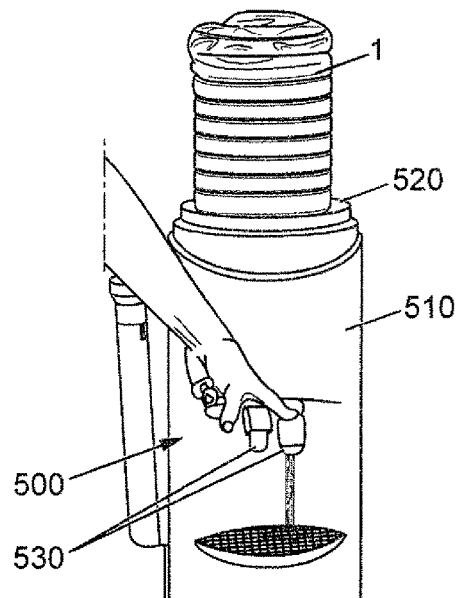
FIG. 5A shows a filled thin-walled bottle according to the present embodiment set upside down and connected to a dispenser.
Figure 5B:
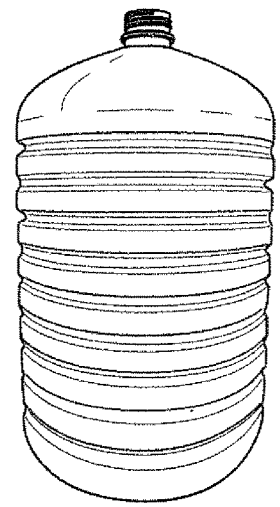
FIG. 5B shows an empty non-capped thin-walled bottle according to the present embodiment, and also shown on FIGS. 1A & 1B.
Figure 5C:
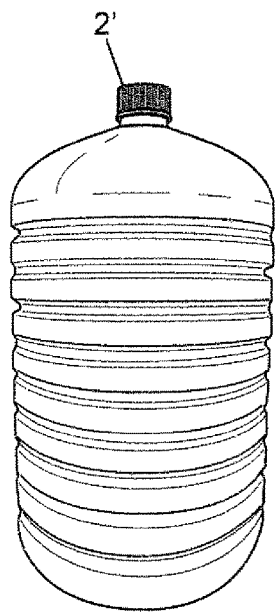
FIG. 5C shows a filled with water and closed thin-walled bottle according to the present embodiment.
Figure 5D:
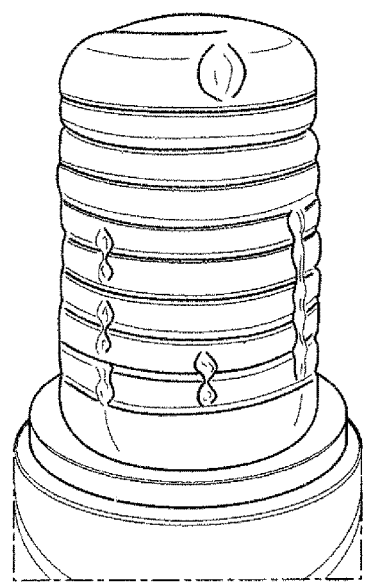
FIGS. 5D to 5I show the thin-walled bottle of FIG. 5C set upside down and connected to a dispenser, in different successive stages of the emptying of the thin-walled bottle on the dispenser.
Figure 5E:
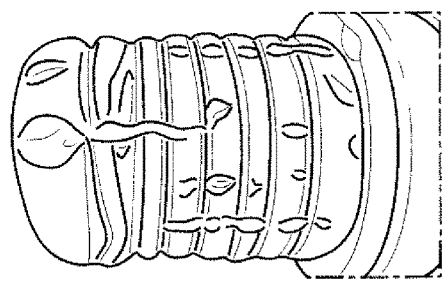
Figure 5F:
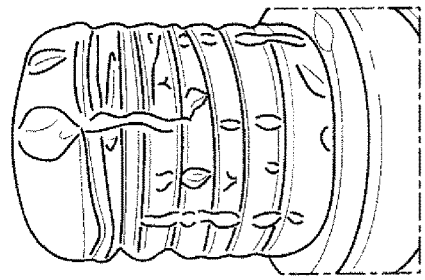
Figure 5G:
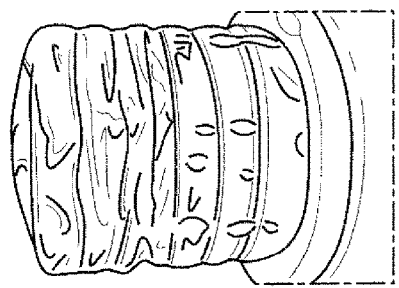
Figure 5H:
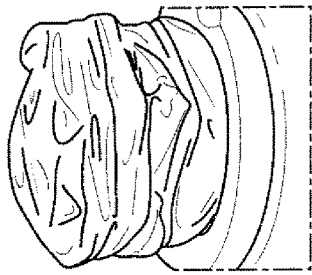
Figure 5I:
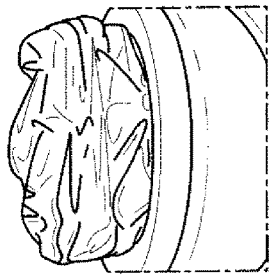
Figure 5J:
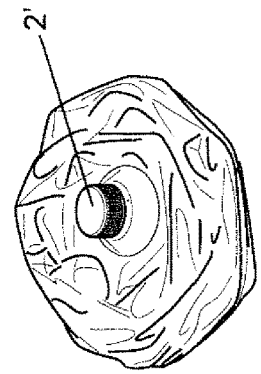
FIG. 5J shows the collapsed and emptied thin-walled bottle removed from the dispenser.

In the thin-walled bottle (1) shown on the enclosed drawings, the neck end (2) is threaded to receive a screwed cap 2' as shown on FIGS. 5C; 5J; 6A; 6B. In a variant, the cap 2' can be a snap cap which is fitted by force on an adapted neck finish composed of a neck end (2) and of a neck support ring (3). Classically, the bottom of the screwed cap 2' is linked to a tamper-proof ring which lies on the neck support ring (3) which separates the neck end (2) and the neck (4).

The rib (5₁) of the shoulder (5) which acts as a retraction starter of the top of the thin-walled bottle (1) is shown in detail on FIG. 2. Said rib (5₁) behaves as a reinforcement which makes it possible the thrusting of the upper part of the shoulder (5) and of the neck end (2), when a downward force is applied on the neck end (2) and/or when a upward force is applied on the bottom (7) of the thin-walled bottle (1). The retraction of the upper part of the shoulder (5) together with the neck end (2) of a water-filled and stacked thin-walled bottle (1) according to the invention is shown on FIG. 6B.

The width of the rib (5₁) is, for instance, comprised between 1-30 mm, preferably between 7-20 mm, more preferably equal to circa 12 mm.

The height of the rib (5₁) is, for instance, comprised between 0.5-20 mm, preferably between 2-10 mm, more preferably equal to circa 6 mm.

The tubular body portion (6) is imprinted with e.g. 9 transversal continuous grooves (6₁), each of them comprising 4 or 6 collapse/fold starters (6₂), which are angularly offset around the axis.

In the embodiment shown on the enclosed figures, especially on FIG. 1A', the grooves (6₁) of the thin-walled bottle (1) have each a V-shaped cross-section, and more particularly two coplanar edges (58) and an intermediate portion between the two edges (58), said intermediate portion presenting an apex (56) inwardly shifted with respect to the two edges. These latter are two straight branches (58) of the V-shape connected via circular arcs 60 to the substantially cylindrical side wall of the thin-walled bottle (1). Each groove (6₁) presents a width (w) measured between the two edges and a maximum height (h) measured between the edges and the apex. In this embodiment, each groove (6₁) includes collapse (or fold) starters (6₂) which are bosses angularly distributed uniformly about the longitudinal axis (64) of the bottle (1) and which project outwardly from the bottoms of the grooves (6₁). Said grooves (6₁) are of constant height h apart from the collapse starters (6₂). The shape of the fold starters (6₂) can be defined as follows. In the plan view of FIGS. 1C&1D (variant), they are respectively curved and circumflex, with an outwardly projecting apex. Each starter (6₂) has a midplane of symmetry (66) that includes the axis (64) of the bottle (1). The midplanes 66 of two consecutive collapse starters in the same groove (6₁) form an angle between them of $2\cdot\pi/n$, where n is the number of collapse starters (6₂) per groove (6₁). The angular extent $\epsilon$ of each collapse starter (6₂) about the bottle axis (64) lies in the range about 0.2 radians to $2\cdot\pi/n$; in its midplane of symmetry (66) that includes the axis of the bottle, each collapse starter (6₂) is defined by a generator line or ridge line (68) which extends between the two branches (58) of the groove (6₂) and which is connected to one of said branches by a circular arc 70 whose concave side faces towards the outside and has a radius lying in the range about 0.5 mm to the radius of the circular arc that is tangential to the generator line (68) and to the branch (58) of the groove; the generator line or ridge line (68) is a straight line connected to the other flank (58) of the groove via a rounded portion (72) of minimum radius of curvature, the connection line being curved in shape in a plane that is perpendicular to the axis of the bottle; the generator line or ridge line (68) is inclined relative to the longitudinal axis (64) of the bottle (1) by an angle γ lying in the range 0 to about 45°; and the radial extent λ of the collapse starter (6₂) in the midplane (74) of the groove (6₁) is substantially equal to or slightly less than half the maximum height (h) of the groove (6₁). The radial extent λ is the distance between the bottom (56) of the groove (6₁) and the point of intersection between the ridge line (68) and the midplane (74) of the groove (6₁). From one groove (6₁) to the next, the collapse starters (6₂) are offset angularly through an angle equal to n/n, where n is the number of collapse starters (6₂) per groove (6₁). The number n lies typically in the range 3 to 20. n=4 or 6 in the present examples, wherein the ridge lines (68) of the collapse starters (6₂) are also inclined to slope downwards and outwards. However, it is also possible to use an orientation that is symmetrical to that shown about a perpendicular to the axis (64) of the bottle (1).

In the embodiment herein described as non limiting example, the mean wall thickness ($T_{mean}$) of the tubular body portion (6) is comprised between 100 and 140 μm In order to assess the wall thickness, a generatrix G of the thin-walled bottle (1) is graduated from (0) to (440).

The origin (0) is placed at the center of the bulge (9).

The graduation (440) is placed at the end of the shoulder (5) and at the beginning of the neck (4).

The tubular body portion (6) is comprised between the graduations circa 100 mm and circa 300 mm.

Figure 3:
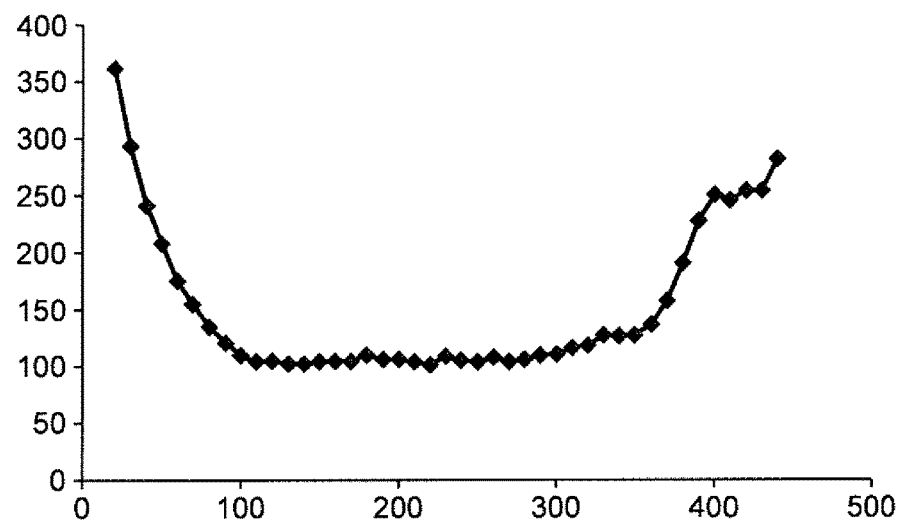
FIG. 3 is a graph showing the mean wall thickness $T_{mean}$ of the thin-walled bottle of the present embodiment made from the PET W170.

FIG. 3 shows the wall thickness along the generatrix G for a bottle according to the present embodiment and made from PET W170, the intrinsic viscosity of which is circa 0.74 dl/g.

The integral bottom structure (7)

The retractation starter (7$_1$) joining the terminal curved portion (8) to the bulge is an annular groove or a folding line shown in details on the FIG. 2. Said annular groove (7$_1$) makes it possible the retractation of the bulge (9), when a upward force is applied on the bottom (7) and/or a downward force is applied on the neck end (2) of the thin-walled bottle (1), as this latter rests on a flat support. This is what is shown on FIGS. 2, 5C, and also on the FIGS. 6A & 6C corresponding to the stacking.

The width of the groove (7$_1$) is, for instance, comprised between 1-15 mm, preferably between 2-8 mm, more preferably equal to circa 4 mm.

The height of the groove (7$_1$) is, for instance, comprised between 0.1-10 mm, preferably between 0.5-4 mm, more preferably equal to circa 2 mm.

The center of the bulge (9) comprises an inwardly extended dome (10).

Figure 4:
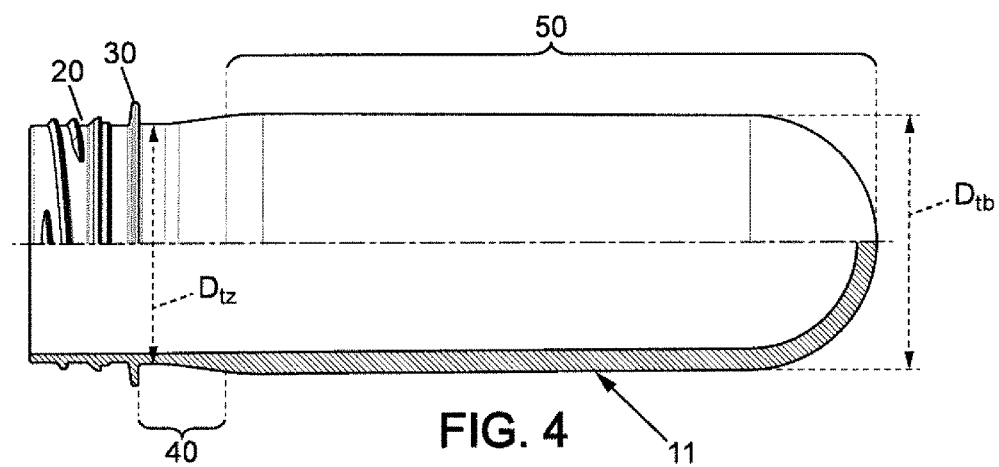
FIG. 4 comprises a front view, with a partial longitudinal section, of a preform of a bottle according to the present embodiment.

FIG. 4 represent a moulded plastic preform (11) for the blow molding manufacture of the thin-walled bottle (1) as above described. Said preform (11) includes from the top to the bottom:

a neck end (20) which is threaded and intended to cooperate with a screw cap;
a neck support ring (30);
a transition zone (40) which will form the neck (4) of the bottle after blow molding;
and a closed tubular body portion (50).

The neck end (20) and the neck support ring (30) foam together the neck finish.

The ratio between the minimum external diameter (D$_{tz}$) of the transition zone (40) on the maximum external diameter (D$_{tb}$) of the closed tubular body portion (50) is for instance: D$_{tz}$/D$_{tb}$ is between 1.8 and 0.3, preferably between 1.4 and 0.5 mm, more preferably for instance equal to 36.5/39.5=0.92.

Advantageously the wall thicknesses of the preform (11) is between 1 and 10 mm, preferably between 2 and 7 mm, more preferably for instance equal to 3.25 mm.

Advantageously the ratio weight (g) of the preform (11)/capacity (liters) of the bottle (1), is between 1 and 10, preferably 4 and 7, for instance equal to 5.5.

The blow moulding manufacturing method of the thin-walled bottle/jug (1) as defined above can be illustrated by the example as follows.

20 liters bottles (1) as above defined are manufactured by injection and blowing with a a standard blow molding device including a shell mold in aluminium with an IR oven composed of 3 ovens and a shaft.

The thermoplastic raw material is a PET resin W170 of NOVAPET and a PET resin Xtreme of VORIDIAN. The intrinsic viscosity of these PET (IV)=0.74 dl/g.

Heat conditioning and preblow step B are implemented. The parameters of this example are given hereafter:

Blowing parameters:
Power of the ovens %

| oven 1 | oven 2 | oven 3 |
|--------|--------|--------|
| 0% | 75% | 100% |
| 0% | 0% | 0% |
| 0% | 55% | 45% |
| 0% | 0% | 0% |
| 0% | 45% | 50% |
| 0% | 0% | 0% |
| 0% | 45% | 50% |
| 0% | 5% | 5% |
| 0% | 45% | 42.5% |
| 0% | 0% | 0% | diameter of the shaft: 16 mm
speed: 1.9 m/s
flow control: 22%
For the blowing: opening 150 mm/closing: 362 mm
The dimensions of the preform and the bottles are as follows:

|  | Preform (injection step A) | Thin-walled bottle (blowing step C) |
|---|---|---|
| Mean Diameter (mm) | 35.65 | 209 |
| Height without neck finish (mm) | 112 | 350 |
| Total weight (g) | 55.43 | 55.43 |
| Neck weight (g) | 4.48 | 4.48 |
| Body weight (g) | 50.95 | 50.95 |

The bottles have a good appearance after blowing

The thickness distribution (T$_{mean}$) of the bottles is given on FIG. 3

The stretching ratios of the thin-walled bottle (1) of the example are as follows:
hoop stretch ratio: 209/35.65=5.86
axial stretch ratio: 3.95
overall stretch ratio: 23.15

The method of bottling a liquid into the of the thin-walled bottle (1) as defined above, consists in filling the thin-walled bottle (1) with a liquid (e.g water) on bottling line, wherein the thin-walled bottle is put under pressure by means of the filled liquid (e.g water) which gives to the thin-walled bottle (1) a mechanical holding/resistance to deformation.

Conventional bottling lines can be adapted to this bottling method.

The method for packing in view of storage and transportation of the thin-walled bottles (1) as defined above, essentially consists in taking advantage of the fact that the upper part of the shoulder (5) together with the neck (4) and the neck finish and the lower part of the integral bottom structure (7) of the thin-walled bottle (1), are retractable under the effect of coaxial forces.

Therefore, it possible to pile the water-filled bottles (1), closed with screwed caps (2'), which are resistant to deformation and which have a self mechanical holding, on top of each other on several levels (100), on a pallet (110).

FIGS. 6A-6B-6C show how the bottles (1) are placed side by side on different superposed levels (100), between which a plate (120) is intercalated. At least some of the bottles' rows are strapped with bands (130). And if need be (see FIG. 6C), an axial pressure is exerted on the top of the top row so as to retract the tops and/or the bottoms of at least some of the palletized thin-walled bottles (1).

The plates (120) can be possibly pierced of holes which are intended to leave the bottles' necks of the lower go through.

It must be emphasized that the remarkable features of the bottles (1) enable a new and efficient way of storage of these bottles (1). Such storage is compact and optimized in terms of transportation.

The method for dispensing a liquid contained in the thin-walled bottle (1) as defined above, as well as the dispenser are described hereinafter in reference to the FIGS. 5A-5J.

The dispenser (500) shown on FIG. 5A comprises a base (510) including in its top a seating (520) designed to receive the top part [neck end (2)-neck support ring (3)-neck (4)-shoulder (5)] of the thin-walled bottle (1), which is set up-side down.

The cap (2') of the bottle (1) is classically perforated by a tip (not shown) which is connected to an inlet pipe (not shown), which is linked to one or several outlets, by which the liquid (e.g. water) coming from the thin-walled bottle (1) can be dispensed. The outlets are each equipped with valves (530) for controlling the flowing of the liquid (e.g. water).

The setting of the filled bottle (1) up-side down on the seating (520) of the dispenser (500) concomitantly with the perforation the cap (2') of the bottle (1) is the first step of the method for dispensing the liquid (e.g. water).

It is noteworthy that this first step does not involve entering of ambient air which could have contaminated the liquid (e.g. water). Moreover, the bottle (1) set up-side down keeps its mechanical holding (self supporting) and self collapses as the liquid (e.g. water) is sampled from the dispenser (500) by opening of the valve (530) as shown on FIG. 5A.

The closing of this valve (530) stops the sampling of liquid (e.g. water) as well as the self collapsing of the bottle (1).

The emptying and the self collapsing of the bottle (1) occur till said bottle is (almost) empty and entirely self collapsed. In this state, the bottle (1) forms a waste which not cumbersome (see FIG. 5J) and which can be easily transported and recovered.

The dispenser (500) is a Home Office Dispenser (HOD) which can be equipped either with a manual pump or to an electric pump, and/or with means for refrigerating the water, one of the valve (530) dispensing refrigerated water and the other non-refrigerated water.

The invention claimed is:

1. A plastic thin-walled container having:
    a top part;
    a tubular body portion;
    and a bottom structure opposite to the top part; wherein
    a) said plastic thin-wall container is self-collapsible during emptying of said plastic thin-walled container, said plastic thin-walled container being configured to collapse when set upside down during emptying without any additional force;
    b) said plastic thin-walled container comprises at least two transversal grooves located in the tubular body portion, at least some of the transversal grooves being equipped with at least two collapse starters;
    c) a mean wall thickness of the tubular body portion is between 65 μm and 150 μm.

2. The plastic thin-walled container according to claim 1, wherein stretching ratios are:
    hoop stretch ratio: 4.0-6.5;
    axial stretch ratio: 2.8-5.0; and
    overall stretch ratio: 11.20-32.5.

3. The plastic thin-walled container according to claim 1, wherein said plastic thin-walled container is manufactured by a blow molding process.

4. The plastic thin-walled container according to claim 1, wherein said plastic thin-walled container is a bottle and that a top part thereof includes:
    a neck end;
    a neck support ring;
    a neck;
    and in that a shoulder joins the neck to the tubular body portion.

5. The plastic thin-walled container according to claim 1, having a volume of at least 2 liters.

6. The plastic thin-walled container according to claim 1, wherein collapse starters extend inwardly -recess- or outwardly -pin- with respect to a longitudinal axis of the plastic thin-walled container.

7. The plastic thin-walled container according to claim 1, wherein the transversal groove or rib has a shape in straight longitudinal section chosen from the group consisting of a U-shape; V-shape and combinations thereof.

8. The plastic thin-walled container according to claim 1, wherein the tubular body portion is cylindrical, polyhedral or comprises plane face(s) and curved face(s).

9. The plastic thin-walled container according to claim 1, wherein the plastic is chosen among polymers which exhibit strain hardening when the polymers are elongated.

10. The plastic thin-walled container according to claim 1, wherein said plastic thin-walled container includes at least one terminal retractable part, which is in at least one of the top part and a bottom structure of the plastic thin-walled container.

11. The plastic thin-walled container according to claim 10, wherein the terminal retractable part comprises at least one retractation starter.

12. A method for dispensing a liquid contained in the plastic thin-walled container according to claim 1, wherein:
    1. said filled plastic thin-walled container is set up-side down on a dispenser comprise at least a valve for controlling the flowing of the liquid;
    2. the valve for controlling the dispensing of the liquid is opened;
    3. the liquid flows out and the plastic thin-walled container self collapses;
    4. the valve for controlling the flowing of the liquid is closed to stop the flowing and the self-collapse;
    5. the collapsed plastic thin-walled container is withdrawn of the dispenser and replaced by a filled plastic thin-walled container as soon as the collapsed plastic thin-walled container does not dispense liquid any longer.

13. The plastic thin-walled container according to claim 1, wherein at least some of the transversal grooves or ribs are equipped with at least 4 collapse starters.

14. The plastic thin-walled container according to claim 1, wherein at least some of the transversal grooves or ribs are equipped with between 4 and 8 collapse starters.

15. The plastic thin-walled container according to claim 1, wherein the mean wall thickness of the tubular body portion is comprised between 90 μm and 130 μm.

16. The plastic thin-walled container according to claim 2, wherein:
    the hoop stretch ratio is 4.2-6.0;
    the axial stretch ratio is 3.0-4.5; and
    the overall stretch ratio is 12.6-27.0.

17. The plastic thin-walled container according to claim 3, wherein said plastic thin-walled container is manufactured by an injection stretch blow molding process.

18. The plastic thin-walled container according to claim 5, wherein the volume is of at least 3 liters.

19. The plastic thin-walled container according to claim 5, wherein the volume is of at least 5 liters.

20. The plastic thin-walled container according to claim 5, wherein the volume is comprised in a range of 2-20 liters.

21. The plastic thin-walled container according to claim 5, wherein the volume is comprised in a range of 7.5-12.5 liters.

22. The plastic thin-walled container according to claim 8, wherein the tubular body portion comprises substantially plane face(s) linked by curved face(s).

23. The plastic thin-walled container according to claim 9, wherein the plastic is chosen among the polyesters.

24. The plastic thin-walled container according to claim 9, wherein the plastic is chosen among the aromatic polyesters.

25. The plastic thin-walled container according to claim 9, wherein the plastic is chosen in the group comprising: PolyEthylene Terephtalate (PET), PolyEthyleneNaphtalate (PEN), PolyEthylene Furanoate (PEF) and PolyPropylene Terephtalate (PPT).

26. The plastic thin-walled container according to claim 11, wherein the at least one retractation starter is at least one of a groove, a folding line and a rib.

* * * * *